May 7, 1935.  H. Y. NORWOOD  2,000,092
THERMOMETER
Filed Oct. 12, 1933
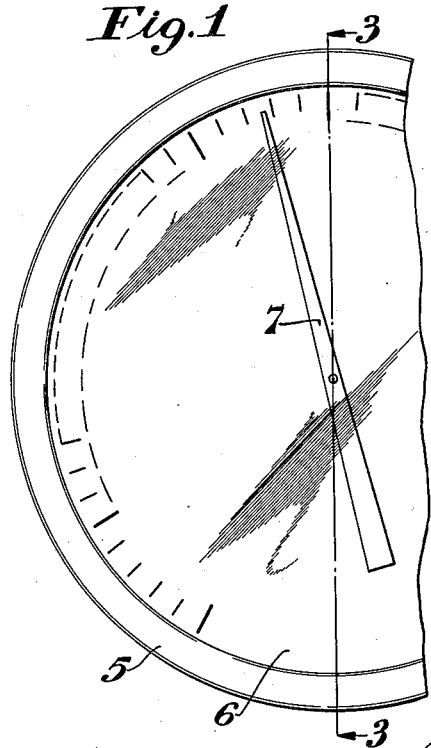
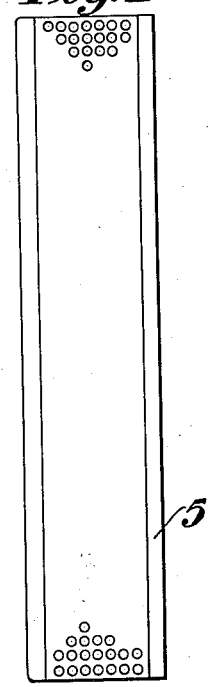
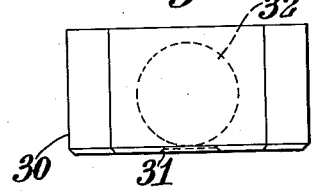
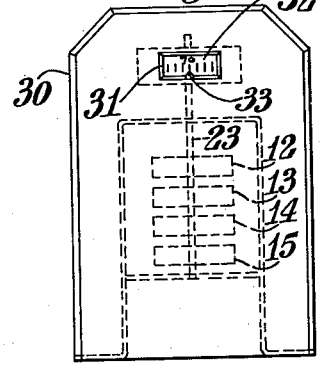
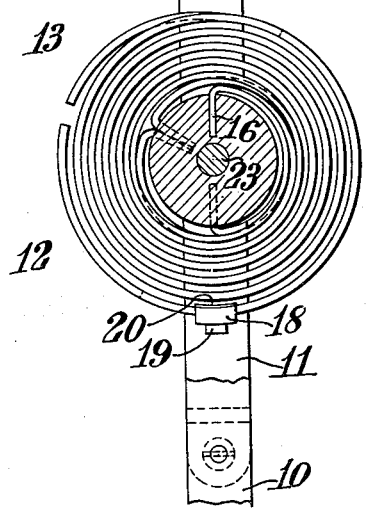
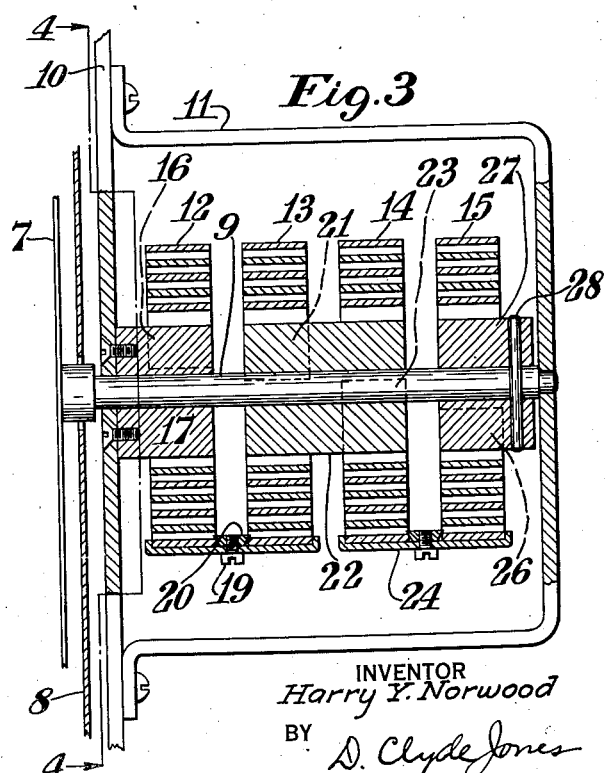
INVENTOR
*Harry Y. Norwood*
BY
*D. Clyde Jones*
ATTORNEY Patented May 7, 1935

2,000,092

UNITED STATES PATENT OFFICE 2,000,092

THERMOMETER

Harry Y. Norwood, Rochester, N. Y., assignor to Taylor Instrument Companies, Rochester, N. Y., a corporation of New York Application October 12, 1933, Serial No. 693,263

1 Claim. (Cl. 297—12)

This invention relates to thermometers and more particularly to thermometers of the metallic type.

While bimetallic thermostatic strips have been widely used in thermometers and while these strips have been wound into coils, they have either been of cumbersome size or else have failed, in the absence of gear mechanism, to provide sufficient movement to actuate the index of the thermometer through the desired range.

In accordance with the present invention, it is proposed to provide an indicating thermometer which not only generates a substantial amount of power, but which also develops a considerable movement in the actuating element for operating the thermometer pointer or other indicator.

Another feature of the invention relates to the provision of a thermometer in which the actuating element is relatively inexpensive to manufacture and yet develops sufficient power and movement for an index of a thermometer as large as several feet across.

These and other features of the invention will appear from the detailed description and claim when taken with the drawing in which Fig. 1 is a fragmentary front view of one form of the thermometer of this invention; Fig. 2 is a side elevation thereof; Fig. 3 is a cross-sectional view taken on the line 3—3 of Fig. 1; Fig. 4 is a cross-sectional view taken on the line 4—4 of Fig. 3; and Figs. 5 and 6 are respectively a top view and a front view of a modified form of the invention in which a drum type indicator is substituted for the index or pointer shown in Fig. 1.

Referring to Figs. 1 and 2, 5 designates a circular case in which the actuating mechanism of the thermometer is mounted. The front of this case is closed by glass window 6 which protects the index 7 and the graduated dial 8 over which the index moves in response to temperature changes. The index is mounted on a shaft 9 extending through the dial and journaled in the frame of the instrument in the manner illustrated in Fig. 3, which frame comprises a flat strip 10 and a U-shaped piece 11 having its ends joined to this strip. The shaft 9 is rotated by a composite spring formed of a series of helically wound bimetallic coil spring sections 12, 13, 14 and 15 arranged in parallel planes at right angles to and enclosing said shaft. Of these spring sections, section 12 has its end 16 attached in a notch in collar 17 which is screwed to the strip 10, while a portion of the coil section 12 near its outer or free end is joined by a rigid connection to an adjacent portion of the outer end of the section 13. This rigid connection comprises a flat piece 18 with upset ends engaging respectively the exposed surfaces of the convolutions of sections 12 and 13 and the opposite edges of these convolutions. The piece 18 is held in the position shown by a screw 19 passing through an aperture in the piece to make threaded engagement with a nut 20. This nut has sides inclined toward the head of the screw which inclined sides engage the opposing edges of the mentioned convolutions to force them respectively toward the adjacent upset ends of piece 18. The inner end of section 13, as indicated at 21, is attached to the sleeve 22 in a notch therein. This sleeve is freely rotatable on the shaft 9 and has attached thereto the inner end of the section 14 as indicated at 23. A portion of section 14 near its free end is connected by a rigid connection, such as previously described, to a portion of the section 15 near its outer end, while the inner end of the section 15 is attached as indicated at 26 to sleeve 27 which is fastened to the shaft 27 by a pin 28.

In the operation of the device let it be assumed that the temperature condition to which the actuating mechanism is exposed, rises, in which case coil sections 12, 13, 14 and 15 tend to unwind. Since one end of the coil section 12 is attached to the fixed collar 17, when this section unwinds it tends to rotate the section 13 which is connected to it by the rigid connection including piece 18. Since section 13 is also exposed to the rising temperature condition it will likewise tend to unwind and thereby rotate the sleeve 21 to which its inner end is connected and as this sleeve rotates on shaft 23, it carries with it the section 14. This section, since it is likewise exposed to the rising temperature, will tend to unwind in like manner and through the rigid connection 24, will carry with it the outer end of the section 15. Section 15, since it is also exposed to the changing temperature condition, will also unwind and will rotate the sleeve 27 and the shaft 9 connected to it, to swing the index 7 in a clockwise direction with respect to the dial 8. Thus the motion of one coil is transmitted to the next coil in the series which, in turn, adds its own movement to that of the preceding coil, and this action is repeated for each of the succeeding coils of the series, that is, the expansion of all of the coils of the series is cumulative. In this manner a wide range of movement of the actuating mechanism is possible without sacrificing power.

It will be understood that when the temperature condition drops, the actuating mechanism including the composite spring comprising the bimetallic coil sections 12, 13, 14 and 15, functions to swing the index 7 in a counterclockwise direction with respect to its dial 8.

In the modified form of the invention illustrated in Figs. 5 and 6, the case 30 is of generally rectangular form and is provided in its front face with a window 31. The actuating mechanism of this thermometer is substantially the same as that previously disclosed except the frame thereof is changed slightly to adapt it to case 30. In this device, however, the composite spring including the coil sections 12, 13, 14 and 15 actuates the shaft 23 in the manner already set forth to rotate a graduated drum 32 behind the window 31 and the fixed pointer 33, which is preferably formed as a part of the frame of the window.

I claim:

Actuating mechanism for a thermo-responsive device comprising a composite spring formed of coaxially arranged bimetallic coil spring sections joined together in series by rigid connections including at least one sleeve, a collar, one end of said spring being fixed, a shaft attached to the other end of said spring, said shaft being rotatable in said collar and extending through said sleeve and through said coil spring sections along the axis thereof, said sleeve being rotatable on said shaft, and a member actuated by said shaft.

HARRY Y. NORWOOD.